(12) United States Patent
Caimano et al.

(10) Patent No.: US 11,536,202 B2
(45) Date of Patent: Dec. 27, 2022

(54) GAS TURBINE ENGINE TURNING SYSTEM

(71) Applicant: GE Avio S.r.l., Rivalta di Torino (IT)

(72) Inventors: Antonio Caimano, Turin (IT); Paolo Altamura, Monopoli (IT); Massimo Civardi, Turin (IT); Giorgio Rivetto, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 330 days.

(21) Appl. No.: 16/497,951

(22) PCT Filed: Mar. 23, 2018

(86) PCT No.: PCT/EP2018/057480
§ 371 (c)(1),
(2) Date: Sep. 26, 2019

(87) PCT Pub. No.: WO2018/177942
PCT Pub. Date: Oct. 4, 2018

(65) Prior Publication Data
US 2021/0108568 A1  Apr. 15, 2021

(30) Foreign Application Priority Data

Mar. 28, 2017 (EP) .................................... 17425037

(51) Int. Cl.
*F02C 7/32* (2006.01)
*F01D 25/36* (2006.01)
(Continued)

(52) U.S. Cl.
CPC ............... *F02C 7/32* (2013.01); *F01D 25/36* (2013.01); *F02C 7/275* (2013.01); *F01D 21/12* (2013.01);
(Continued)

(58) Field of Classification Search
CPC .... F02C 7/32; F02C 7/275; F02C 7/06; F01D 25/36; F01D 21/12; F01D 21/14;
(Continued)

(56) References Cited

U.S. PATENT DOCUMENTS 2,930,188 A   3/1960   Haworth et al.
3,365,614 A   1/1968   Luongo et al.
(Continued)

FOREIGN PATENT DOCUMENTS

DE   19653962 A1   6/1998
EP    2604808 A1   6/2013
(Continued)

OTHER PUBLICATIONS

NSK Motion and Control, 2013, Drawn Cup Roller Clutches, www.bearing.co.il/E1420.pdf</i> (Year: 2013).*
(Continued)

*Primary Examiner* — Gerald L Sung
*Assistant Examiner* — Rene D Ford
(74) *Attorney, Agent, or Firm* — Dority & Manning, P.A.

(57) ABSTRACT

A gas turbine engine (10) includes a compressor section, a turbine section, and an accessory gearbox (100). A turning unit (200) for the gas turbine engine includes an output assembly (204) configured to be mechanically coupled to the gas turbine engine, and an electric motor (202). The electric motor is operable to rotate, through the output assembly, one or more components of the compressor section or the turbine section at a rotational speed less than about fifty revolutions per minute during a shut-down condition of the gas turbine engine.

20 Claims, 6 Drawing Sheets

(51) Int. Cl.
*F02C 7/275* (2006.01)
*F01D 21/12* (2006.01)
*F01D 21/14* (2006.01)
*F02C 7/06* (2006.01)

(52) U.S. Cl.
CPC ................ *F01D 21/14* (2013.01); *F02C 7/06* (2013.01); *F05D 2220/323* (2013.01); *F05D 2260/4023* (2013.01); *F05D 2260/40311* (2013.01); *F05D 2260/85* (2013.01); *F05D 2260/98* (2013.01); *F05D 2270/303* (2013.01); *F05D 2270/335* (2013.01); *F05D 2270/62* (2013.01)

(58) Field of Classification Search
CPC ............... F01D 19/02; F05D 2220/323; F05D 2260/4023; F05D 2260/40311; F05D 2260/85; F05D 2260/98; F05D 2270/303; F05D 2270/335; F05D 2270/62; F05D 2260/311; F05D 2260/40
See application file for complete search history.

(56) References Cited

U.S. PATENT DOCUMENTS

| | | | |
|---|---|---|---|
| 4,854,120 A | 8/1989 | Nelson et al. | |
| 5,210,704 A | 5/1993 | Husseiny | |
| 5,831,429 A | 11/1998 | Germanetti | |
| 6,175,793 B1 | 1/2001 | Ironside | |
| 8,364,424 B2 | 1/2013 | Lou et al. | |
| 8,515,640 B2 | 8/2013 | Monti et al. | |
| 10,473,164 B2 | 11/2019 | Slayter et al. | |
| 2011/0299971 A1* | 12/2011 | Lemmers, Jr. | F01D 11/10 415/122.1 |
| 2013/0149102 A1 | 6/2013 | Marcucci et al. | |
| 2014/0318144 A1 | 10/2014 | Lazzeri et al. | |
| 2016/0178464 A1 | 6/2016 | Burns et al. | |
| 2017/0234232 A1* | 8/2017 | Sheridan | H02J 7/0068 307/9.1 |
| 2018/0010648 A1* | 1/2018 | Slayter | F01D 25/36 |
| 2018/0195437 A1* | 7/2018 | Stephan | F02C 7/06 |

FOREIGN PATENT DOCUMENTS

| | | |
|---|---|---|
| WO | WO2013072291 A1 | 5/2013 |
| WO | WO2018/177942 A1 | 8/2018 |

OTHER PUBLICATIONS

International Search Report and Opinion Corresponding to Application No. PCT/EP2018/057480 dated Jun. 29, 2018.

* cited by examiner

GAS TURBINE ENGINE TURNING SYSTEM

FIELD

The present subject matter relates generally to a turning unit for a gas turbine engine, and a method of using the same.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Conventionally, at least one turbine within the turbine section is coupled to a compressor within the compressor section through a rotatable shaft or spool. During the above operations of the gas turbine engine, a temperature of this spool may be relatively elevated due to its exposure or proximity to the combustion gases. Subsequent to operating the gas turbine engine, e.g., subsequent to flight operations of the gas turbine engine, the spool may no longer be rotated as combustion gases no longer flow through the turbine section to drive the turbine.

However, for at least a certain time period, the spool may remain at a relatively elevated temperature. The idle spool at relatively elevated temperatures is susceptible to bowing or other plastic deformation by virtue of its relatively elevated temperature and a weight of the various components supported at least in part by the spool.

Accordingly, a gas turbine engine including one or more features capable of minimizing a risk of bowing or other plastic deformation would be useful. More specifically, a gas turbine engine including one or more features capable of minimizing a risk of bowing or other plastic deformation subsequent to flight operations of the gas turbine engine would be particularly beneficial.

BRIEF DESCRIPTION

Aspects and advantages of the invention will be set forth in part in the following description, or may be obvious from the description, or may be learned through practice of the invention.

In one aspect of the present disclosure, a turning unit for a gas turbine engine is provided. The gas turbine engine includes a compressor section, a turbine section, and an accessory gearbox. The turning unit includes an output assembly configured to be mechanically coupled to the gas turbine engine. The turning unit also includes an electric motor operable to rotate, through the output assembly, one or more components of the compressor section or the turbine section at a rotational speed less than about fifty revolutions per minute during a shut-down condition of the gas turbine engine.

In certain exemplary aspects, the output assembly is configured to be connected to the accessory gearbox of the gas turbine engine.

Additionally, in certain exemplary aspects, the turning unit further includes a reduction gearbox, wherein the output assembly is rotatable by the electric motor across the reduction gearbox. For example, with such an exemplary aspect, the reduction gearbox may have a gear ratio of at least about 100:1.

Further, in certain exemplary aspects the turning unit further includes a one-way clutch, wherein the electric motor is mechanically connected to the output assembly through the one-way clutch. For example, with such an exemplary aspect the turning unit may further include a lubrication oil system for lubricating the one-way clutch.

Moreover, in certain exemplary aspects the output assembly includes a shear neck. Additionally, in certain exemplary aspects, the output assembly includes a first rotating member and a second rotating member, and wherein the first and second rotating members together form a one-way clutch. For example, with such an exemplary aspect the second rotating member may be configured for coupling the turning unit to the accessory gearbox of the gas turbine engine. Additionally, with such an exemplary aspect the second rotating member may define an opening, the first rotating member may include an extension extending through the opening, and the output assembly may further include a spring member attached to the extension and pressing together the one-way clutch formed by the first and second rotating members.

Further, in certain exemplary aspects the electric motor is configured to be electrically connected to a ground power source.

Moreover, in certain exemplary aspects the electric motor generates a maximum power of less than fifty watts.

In another exemplary aspect of the present disclosure, a gas turbine engine is provided. The gas turbine engine includes a compressor section and a turbine section. The gas turbine engine also includes an accessory gearbox mechanically coupled to one or more components of the compressor section or the turbine section. The gas turbine engine also includes a turning unit having an output assembly and an electric motor, the output assembly mechanically coupled to the accessory gearbox and the electric motor operable to rotate, through the output assembly, the one or more components of the compressor section or the turbine section at a rotational speed less than about fifty revolutions per minute during a shut-down condition of the gas turbine engine.

In an exemplary aspect of the present disclosure, a method of operating a gas turbine engine is provided. The method includes shutting down the gas turbine engine subsequent to flight operations of the gas turbine engine. The method also includes rotating with a turning unit at least a portion of a compressor section or a turbine section of the gas turbine engine at a rotational speed of less than about fifty revolutions per minute.

In certain exemplary aspects, rotating with the turning unit at least a portion of the compressor section or the turbine section of the gas turbine engine includes determining a torque within the turning unit.

For example, in certain exemplary aspects, determining the torque within the turning unit includes sensing a current feedback from an electric motor of the turning unit, and sensing a temperature in or around the electric motor of the turning unit.

Moreover, in certain exemplary aspects, wherein determining the torque within the turning unit includes determining the torque is either below a predetermined minimum threshold or above a predetermined maximum threshold, and ceasing rotation of the gas turbine engine with the turning unit in response to determining the torque is either below the predetermined minimum threshold or above the predetermined maximum threshold.

Additionally, in certain exemplary aspects, rotating with the turning unit at least a portion of the compressor section or the turbine section of the gas turbine engine includes powering an electric motor of the turning unit using a ground power source.

Further, in certain exemplary aspects, rotating with the turning unit at least a portion of the compressor section or the turbine section of the gas turbine engine includes rotating with the turning unit at least a portion of the compressor section or the turbine section of the gas turbine engine through an accessory gearbox of the gas turbine engine.

Moreover, in certain exemplary aspects, the method further includes starting up the gas turbine engine for flight operations, and passively decoupling an electric motor of the turning unit from an accessory gearbox of the gas turbine engine.

These and other features, aspects and advantages of the present invention will become better understood with reference to the following description and appended claims. The accompanying drawings, which are incorporated in and constitute a part of this specification, illustrate aspects of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
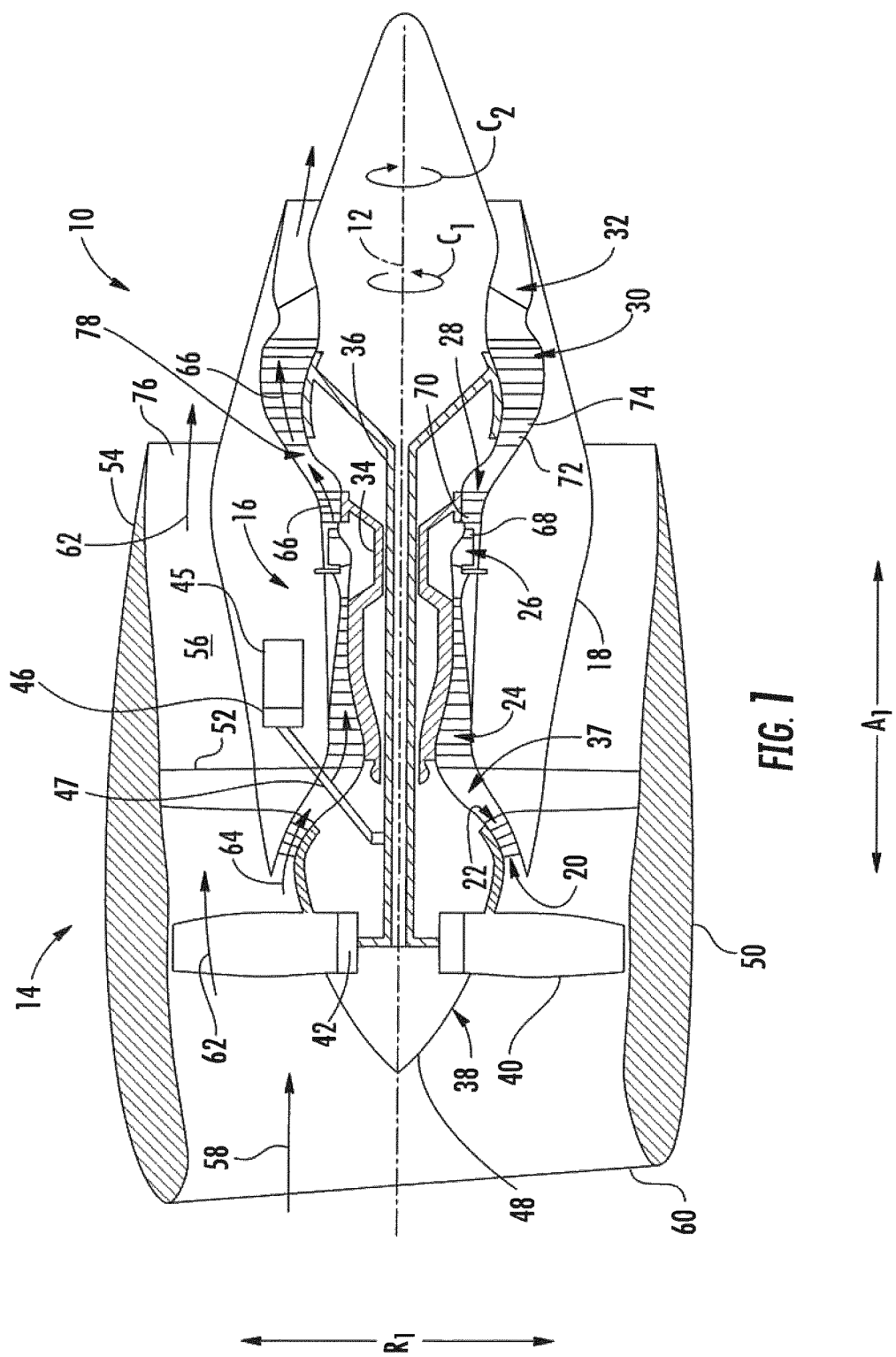
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10% margin. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller", are not limited to just those integrated circuits referred to in the art as a computer, but further broadly refers to one or more processing devices including one or more of a microcontroller, a microcomputer, a programmable logic controller (PLC), an application specific integrated circuit, and other programmable circuits, and these terms are used interchangeably herein. In the embodiments described herein, the computer or controller may additionally include memory. The memory may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, the computer or controller may include one or more input channels and/or one or more output channels. The input channels may be, but are not limited to, computer peripherals associated with an operator interface such as a mouse and a keyboard, or sensors, such as engine sensors associated with an engine, such as a gas turbine engine, for determining operating parameters of the engine. Furthermore, in the exemplary embodiment, the output channels may include, but are not limited to, an operator interface monitor. Further, the memory may store software or other instructions, which when executed by the controller or processor allow the controller to perform certain operations or functions, such as one or more of the functions described in the method 300, below. The term "software" may include any computer program stored in memory, or accessible by the memory, for execution by, e.g., the controller, processor, clients, and servers.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A1 (extending parallel to a longitudinal centerline 12 provided for reference), a radial direction R1, and a circumferential direction C1 (i.e., a direction extending about the axial direction A1). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, and turbine section together define at least in part a core air flowpath 37 of the turbofan engine 10. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a fan 38 having a plurality of fan blades 40 coupled to a disk 42 in a spaced apart manner. As is depicted, the fan blades 40 extend outwardly from disk 42 generally along the radial direction R1. The disk 42 is covered by rotatable front nacelle 48 aerodynamically contoured to promote an airflow through the plurality of fan blades 40. The fan blades 40 and disk 42 are together rotatable about the longitudinal axis 12 by LP shaft 36.

As is depicted, the exemplary turbofan engine 10 further includes an accessory gearbox 45 attached to the gas turbine engine and mechanically coupled to a spool of the gas turbine engine. More specifically, the accessory gearbox 45 is attached to the core turbine engine 16 of the turbofan engine 10, and is mechanically coupled to the LP spool 36 of the turbofan engine 10 through a transfer gearbox 46 and transfer shaft 47. Although not depicted, an electric machine (i.e., a starter motor/generator) may be coupled to the accessory gearbox 45 for, e.g., starting the turbofan engine 10 and/or generating electrical power once the turbofan engine 10 is running. It should be appreciated, however, that in other exemplary embodiments, the accessory gearbox 45 may instead be coupled to any other suitable section of the gas turbine engine, such as to the HP spool 34 of the turbine turbofan engine 10 depicted.

Referring still to the exemplary embodiment of FIG. 1, the exemplary fan section 14 includes an annular fan casing or outer nacelle 50 that circumferentially surrounds the fan 38 and/or at least a portion of the core turbine engine 16. The nacelle 50 is supported relative to the core turbine engine 16 by a plurality of circumferentially-spaced outlet guide vanes 52. Additionally, a downstream section 54 of the nacelle 50 extends over an outer portion of the core turbine engine 16 so as to define a bypass airflow passage 56 therebetween.

During operation of the turbofan engine 10, such as during flight operations of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be configured as a geared turbofan engine (i.e., including a reduction gearbox); may not include variable-pitch fan blades; may include any other suitable number of spools, compressors, or turbines; etc. Additionally, the turbofan engine 10 may instead be configured as any other suitable aeronautical gas turbine engine, such as a turboshaft engine, turboprop engine, turbojet engine, etc. Additionally, still, the turbofan engine 10 may instead be configured as an aeroderivative gas turbine engine (e.g., for nautical applications), an industrial gas turbine engine, or as any other suitable gas turbine engine.

Figure 2:
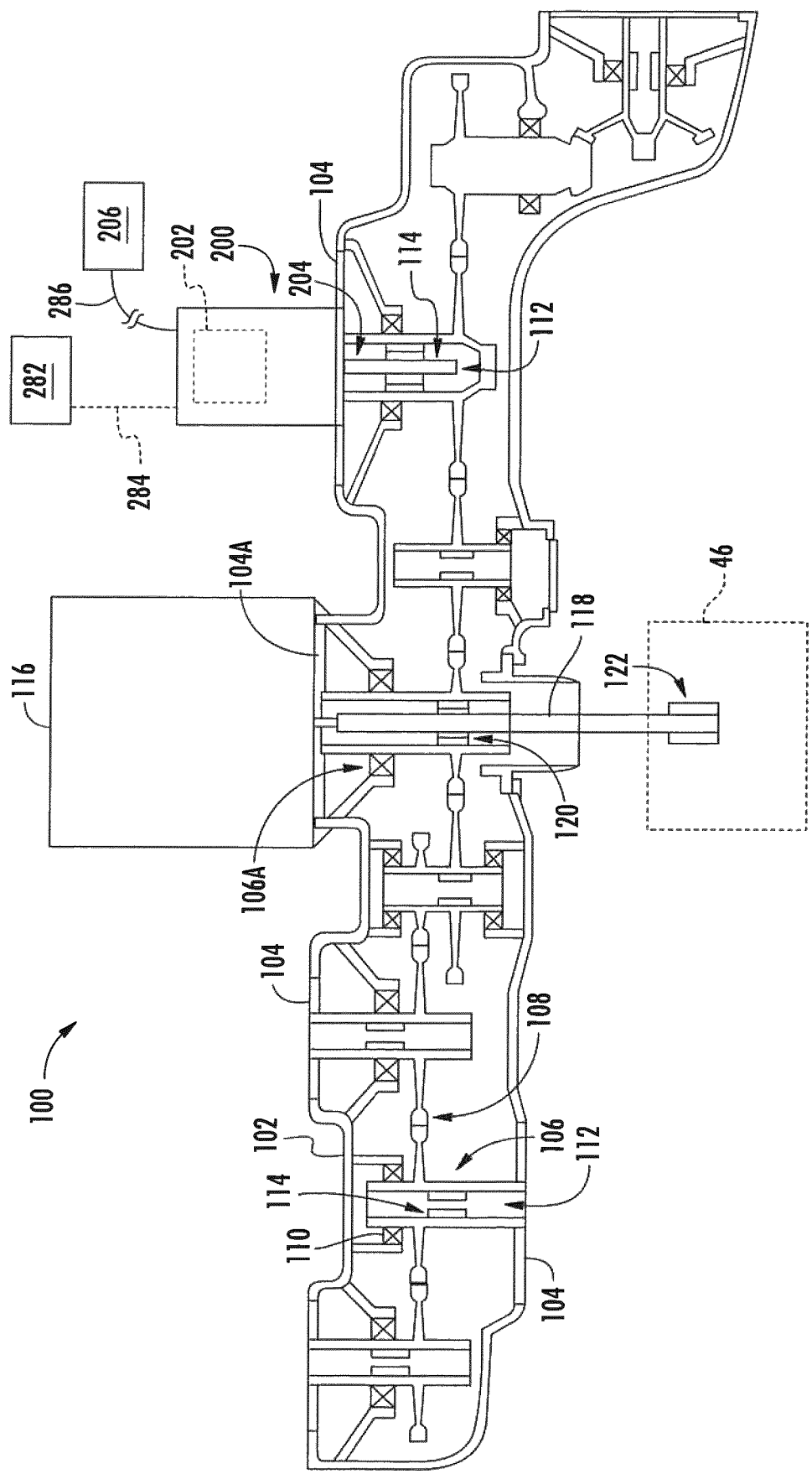
FIG. 2 is a schematic view of an accessory gearbox and a turning unit in accordance with an exemplary embodiment of the present disclosure.

Referring now to FIG. 2, a schematic view is provided of an exemplary accessory gearbox 100 for a gas turbine engine in accordance with an exemplary embodiment of the present disclosure. The accessory gearbox 100 of FIG. 2 may be configured to be attached to the exemplary turbofan engine 10 of FIG. 1, similar to the exemplary accessory gearbox 45 depicted in FIG. 1, or alternatively may be configured to be attached to any other suitable gas turbine engine.

As is depicted, the exemplary accessory gearbox 100 generally includes an outer casing 102 surrounding various internal components of the accessory gearbox 100. The accessory gearbox 100 may be attached to a gas turbine engine at an outer casing of the gas turbine engine, such as at or within the casing 18 of the turbine engine 10 (see FIG. 1). The accessory gearbox 100 additionally includes a plurality of accessory pads 104 positioned adjacent to a respective plurality of accessory gears 106. Each of the accessory gears 106 is mechanically coupled to one another through, e.g., meshing teeth 108 to transmit torque between the plurality of accessory gears 106. Additionally, each of the plurality of accessory gears 106 is supported within the outer casing 102 of the accessory gearbox 100 by one or more bearings 110. Moreover, for the exemplary embodiment depicted, each accessory gear 106 defines a cylindrical opening 112 with a splined portion 114 for coupling to the respective accessory systems (not all shown). For example, during operation of the gas turbine engine, accessory systems may be attached to the respective accessory pads 104 and may include a shaft extending into the accessory gearbox 100. The shafts of the accessory systems may extend through the respective cylindrical opening 112 and couple to the respective splined portion 114 in order to mechanically couple the accessory system to the respective accessory gear 106. Rotation of an accessory gear 106 may therefore correspondingly drive a respective accessory system. The accessory systems may include, for example, a lubrication oil system of the gas turbine engine, etc.

It should be appreciated, however, that in other exemplary embodiments the accessory gearbox 100 may include any other suitable configuration of accessory pads 104 and accessory gears 106. Additionally, in other exemplary embodiments, one or more of the plurality of accessory gears 106 may be coupled to a respective accessory system in any other suitable manner.

Referring particularly to the embodiment of FIG. 2, the accessory gearbox 100 may additionally be used to startup the gas turbine engine. For example, at least one of the accessory pads 104 and accessory gears 106 is a starter gear 106A and starter pad 104A. A starter motor/generator 116 is attached to the starter pad 104A and generally includes a driveshaft 118 that extends through the accessory gearbox 100 and mechanically couples to the starter gear 106A through a splined connection 120. Additionally, the driveshaft 118 of the starter motor/generator 116 includes a splined end 122 that couples to a transfer gearbox 46 (depicted in phantom). The transfer gearbox 46 is, in turn, mechanically coupled to the core turbine engine 16 (see, e.g., FIG. 1).

As will be appreciated, in at least certain exemplary embodiments, the one or more components of the compressor section or the turbine section of the gas turbine engine rotated by the starter motor/generator 116 during such startup operations may include a compressor of the compressor section and a turbine of the turbine section, such as the LP compressor 22 of the compressor section and the LP turbine 30 of the turbine section. By contrast, once the gas turbine engine is operating under its own power, rotational power may be transferred from the core turbine engine 16, through the transfer gearbox 46, through the driveshaft 118, to the starter gear 106A, and accordingly, to the starter motor/generator 116 and each of the additional accessory gears 106 and accessory systems. Such a configuration allows for the core turbine engine 16 to power the various accessory systems during operation of the gas turbine engine.

During flight operations of the gas turbine engine, a temperature of one or more components within the core turbine engine may be relatively elevated. For example, the LP shaft 36 may be at a relatively elevated temperature as a result of the combustion gases and high amount of air compression. Accordingly, subsequent to flight operations, under certain conditions, one or more of these components may be susceptible to "bowing" or other plastic deformation. More specifically, a weight of one or more of these components, in combination with the relatively elevated temperatures, may cause the component to deform.

In order to prevent or minimize a risk of the one or more components within the gas turbine engine deforming, the present disclosure includes a turning unit 200. As will be discussed in greater detail below, the turning unit 200 generally includes an electric motor 202 and an output assembly 204. In certain exemplary embodiments, the electric motor 202 may be, e.g., a three-phase electric motor. Additionally, the electric motor 202 may be a relatively small electric motor 202 configured to generate a maximum power of less than about fifty watts. For example, in certain exemplary embodiments, the electric motor 202 may be configured to generate a maximum power less than about forty watts, such as less than about thirty watts, such as less than about twenty watts. It should be appreciated, however, that in other exemplary embodiments, the electric motor 202 may instead be configured as a pneumatic or hydraulic motor.

Further, the output assembly 204 is mechanically coupled to the accessory gearbox 100 and the electric motor 202 is operable to rotate, through the output assembly 204 and accessory gearbox 100, one or more components of the compressor section or the turbine section of the gas turbine engine at a relatively low rotational speed during a shutdown condition of the gas turbine engine. For example, in certain exemplary aspects, the electric motor 202 may be configured to rotate one or more components of the compressor section or the turbine section at a rotational speed less than about fifty revolutions per minute, less than about twenty-five revolutions per minute, less than about ten revolutions per minute, less than about five revolutions per minute, or less than about two revolutions per minute during the shutdown condition of the gas turbine engine. It should be appreciated, that as used herein, a "shut down condition" of the gas turbine engine refers to any operating condition of the gas turbine engine in which the components, such as one or more of the compressors or turbines, are not being rotated by virtue of combustion gases flowing through the turbine section.

Moreover, as is also depicted in FIG. 2, it should be appreciated that for the embodiment depicted the electric motor 202 of the turning unit 200 is configured to be electrically connected to a ground power source 206. As used herein, "ground power source" refers to any source of power external to the gas turbine engine and an aircraft to which the gas turbine engine is attached or installed. Accordingly, the ground power source 206 may refer to a power source connected to an electrical grid, an external generator, or other external power source. Such a configuration may allow for the turning unit 200 to operate during the shutdown condition of the gas turbine engine where power is not being generated by the gas turbine engine. Notably, the electric motor 202 of the turning unit 200 may not be connected directly to the ground power source 206, and instead be connected to the ground power source 206 through an electrical system of the aircraft with which the gas turbine engine is installed (the electrical system of the aircraft being connected to the ground power source 206). Regardless of the configuration, however, the electric motor 202 of the turning unit 200 may be considered to be connected to the ground power source 206.

It should be appreciated, however, that in other exemplary embodiments, the electric motor 202 may instead be configured to be electrically connected to any other power source, such as a power source internal to the aircraft or gas turbine engine (e.g., an electrical power storage device, such as a battery).

Figure 3:
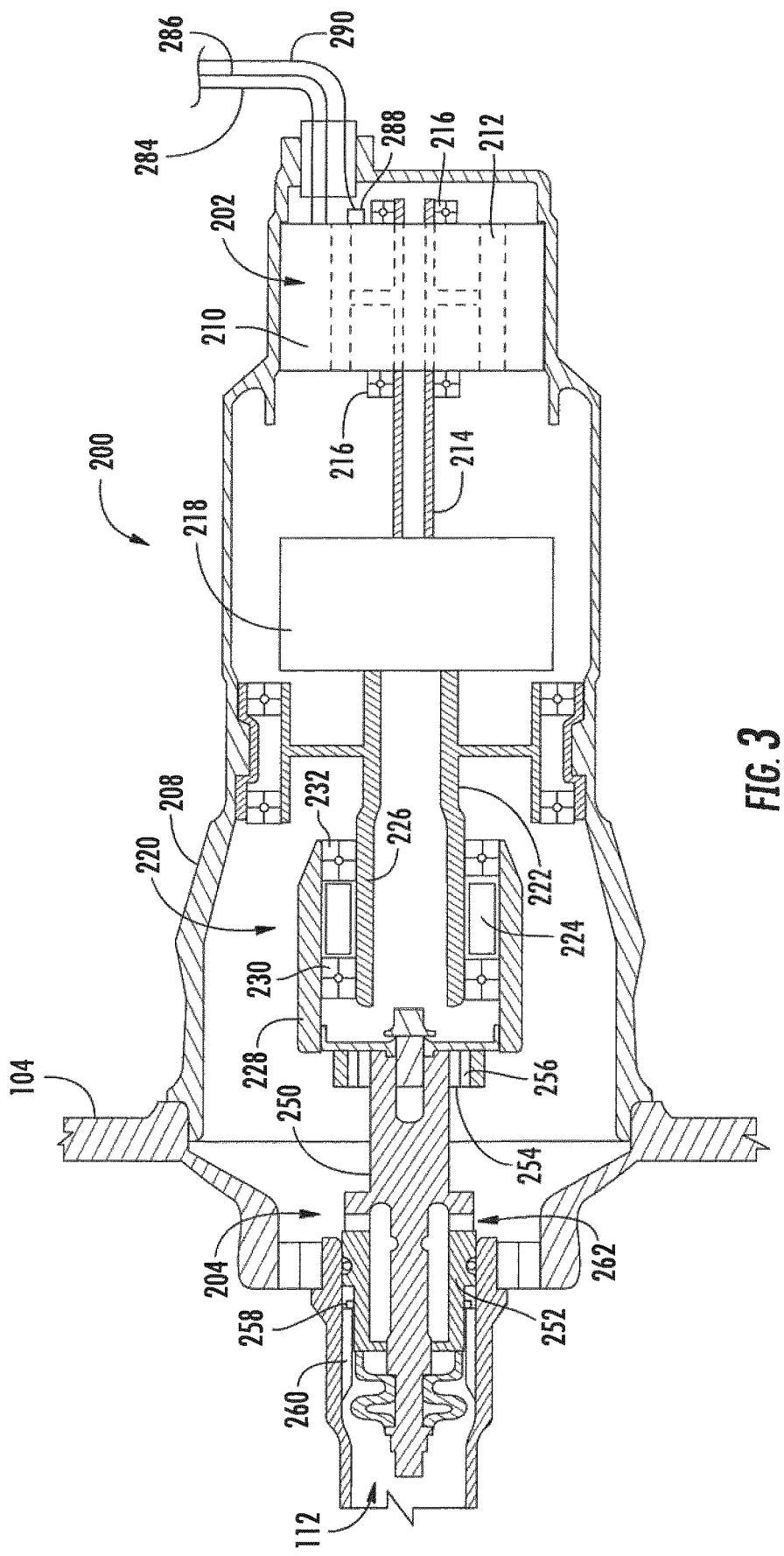
FIG. 3 is a close-up, cross-sectional view of the exemplary turning unit of FIG. 2.

Referring now to FIG. 3, a cross-sectional view of a turning unit 200 for a gas turbine engine in accordance with an exemplary embodiment of the present disclosure is provided. In certain exemplary embodiments, the turning unit 200 of FIG. 3 may be configured as the turning unit 200 described above with reference to FIG. 2. Accordingly, and as is depicted, the exemplary turning unit 200 of FIG. 3 generally includes an output assembly 204 configured to be mechanically coupled to the gas turbine engine and an electric motor 202 operable to rotate, through the output assembly 204, one or more components of the compressor section or the turbine section of the gas turbine engine at a relatively low rotational speed (described more fully above) during a shutdown condition of the gas turbine engine.

As is depicted, the turning unit 200 includes an outer casing 208 surrounding at least certain of the various components of the turning unit 200 and coupling the turning unit 200 to the accessory gearbox 100. More specifically, the outer casing 208 of the turning unit 200 is coupled to an accessory pad 104 of the accessory gearbox 100, such as one or more of the accessory pads 104 of the accessory gearbox 100 depicted in FIG. 2.

Additionally, the outer casing 208 surrounds and encloses the electric motor 202. The electric motor 202 is configured as an in-runner electric motor including a stator 210 and a rotor 212, the rotor 212 rotatable relative to the stator 210 and positioned at a location radially inward of the stator 210. However, in other exemplary embodiments, the electric motor 202 may instead be configured as an out-runner electric motor with the stator 210 instead positioned radially inward of the rotor 212. As will be discussed in greater detail below, the electric motor 202 is operably connected to a controller 282 of the turning unit 200 via, for the embodiment depicted, a wired connection 284, and is further operably connected to a power source, such as a ground power source 206, also via a wired connection 286.

Referring still to FIG. 3, the rotor 212 is attached to and rotatable with a first drive shaft, which for the embodiment depicted is an electric motor drive shaft 214. The electric motor drive shaft 214 is supported within the outer casing 208 of the turning unit 200 through the plurality of bearings 216. The bearings 216 may be one or more of ball bearings, roller bearings, tapered roller bearings, or any other suitable type of bearing.

As is also depicted in the exemplary embodiment of FIG. 3, the turning unit 200 additionally includes a reduction gearbox 218 and a primary one-way clutch 220. A second shaft 222 is provided within the outer casing 208, extending from the reduction gearbox 218 to the primary one-way clutch 220. The primary one-way clutch 220 is, in turn, connected to the output assembly 204. Accordingly, as will be appreciated, the output assembly 204 is rotatable by the electric motor 202 across the reduction gearbox 218, and further the electric motor 202 is mechanically connected to the output assembly 204 through the primary one-way clutch 220.

Referring particularly to the reduction gearbox 218, the reduction gearbox 218 may have any suitable configuration for reducing a rotational speed of the second shaft 222 relative to the electric motor drive shaft 214. For example, in certain exemplary embodiments, the reduction gearbox 218 may include an epicyclic gear set, such as a planetary gear set. As will be appreciated, the reduction gearbox 218 therefore allows for the electric motor 202 to rotate at a relatively high rotational speed, while turning the second shaft 222 and the various components of the gas turbine engine at a relatively low rotational speed. For example, in certain exemplary embodiments, the reduction gearbox 218 has a gear ratio at least about 100:1 (i.e., for every 100 rotations of the electric motor drive shaft 214, the second shaft 222 rotates once). However, in other exemplary embodiments, the reduction gearbox 218 may have an even higher gear ratio. For example, in other exemplary embodiments, the reduction gearbox 218 may have a gear ratio of at least about 150:1, of at least about 200:1, of at least about 250:1, of at least about 300:1, or of at least about 350:1.

Additionally, referring now specifically to the primary one-way clutch 220, as stated, the second shaft 222 and the electric motor 202 are mechanically connected to the output assembly 204 through the primary one-way clutch 220. The primary one-way clutch 220 is configured as a passive one-way clutch, as it automatically transfers rotational torque and power when the second shaft 222 is rotated in a first circumferential direction relative to the output assembly 204 and automatically prevents transfer of rotational torque and power when the second shaft 222 is rotated in a second circumferential direction (i.e., a circumferential direction opposite the first circumferential direction) relative to the output assembly 204, such as when the output assembly 204 is rotated more quickly than the second shaft 222.

Figure 4:
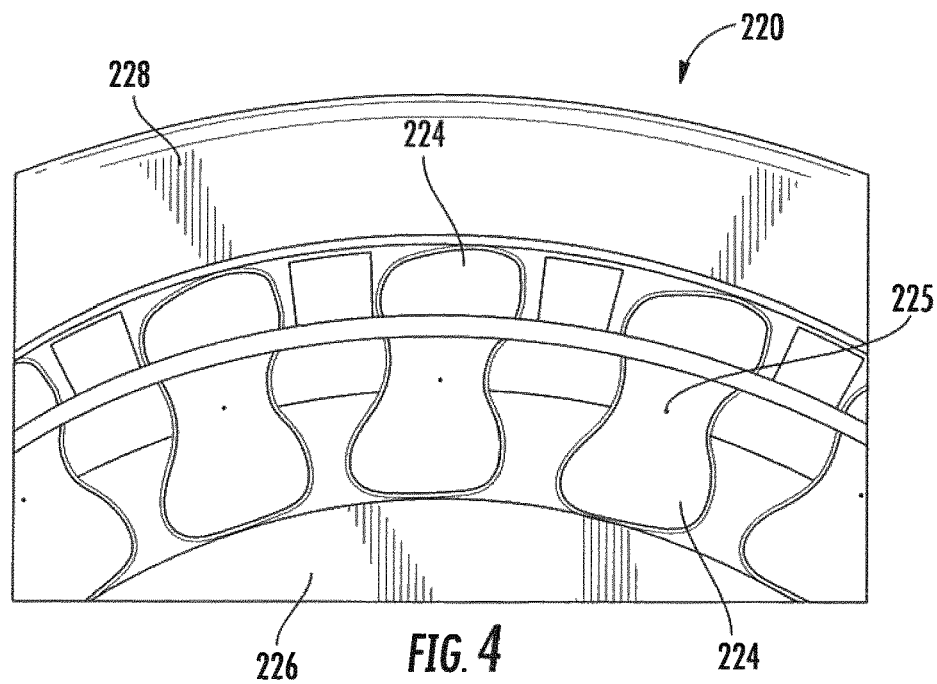
FIG. 4 is an axial view of a primary one-way clutch of the exemplary turning unit of FIG. 2 in accordance with an exemplary embodiment of the present disclosure.

More specifically, for the embodiment depicted, the primary one-way clutch 220 is configured as a sprag clutch. Referring briefly to FIG. 4, a schematic, axial view of the exemplary primary one-way clutch 220 is provided. The exemplary sprag clutch depicted includes a plurality of sprags 224 positioned between an inner race 226 and an outer race 228. The inner race 226 is fixed to, or formed integrally with, the second shaft 222 and the outer race 228 is coupled to the output assembly 204. When the inner race 226 rotates counterclockwise relative to the outer race 228 (at least for view of the embodiment depicted), the plurality of sprags 224 provide substantially no resistance to such movement. By contrast, when the inner race 226 attempts to rotate clockwise relative to the outer race 228, the plurality of sprags 224 rotate about each of their respective axes of rotation 225 and lock the inner race 226 to the outer race 228, such that no relative rotation of the inner race 226 to the outer race 228 in the clockwise direction is allowed. It should be appreciated, however, that in other embodiments, any other suitable primary one-way clutch 220 may be utilized.

As will be appreciated, inclusion of the primary one-way clutch 220 within the turning unit 200 may allow for the electric motor 202 to rotate one or more accessory gears 106 of the accessory gearbox 100 (and, in turn, rotate one or more components of a compressor section or a turbine section of a gas turbine engine) when the gas turbine engine is in a shutdown operating condition. Additionally, inclusion of the primary one-way clutch 220 within the turning unit 200 prevents a rotation of the accessory gears 106 of the accessory gearbox 100 from being transferred back through the turning unit 200 to the electric machine 202, e.g., during flight operations of the gas turbine engine wherein such components of the accessory gearbox 100 are rotating much more quickly than is desirable for the electric motor 202. Such a configuration may therefore increase a useful life of the turning unit 200.

Figure 5:
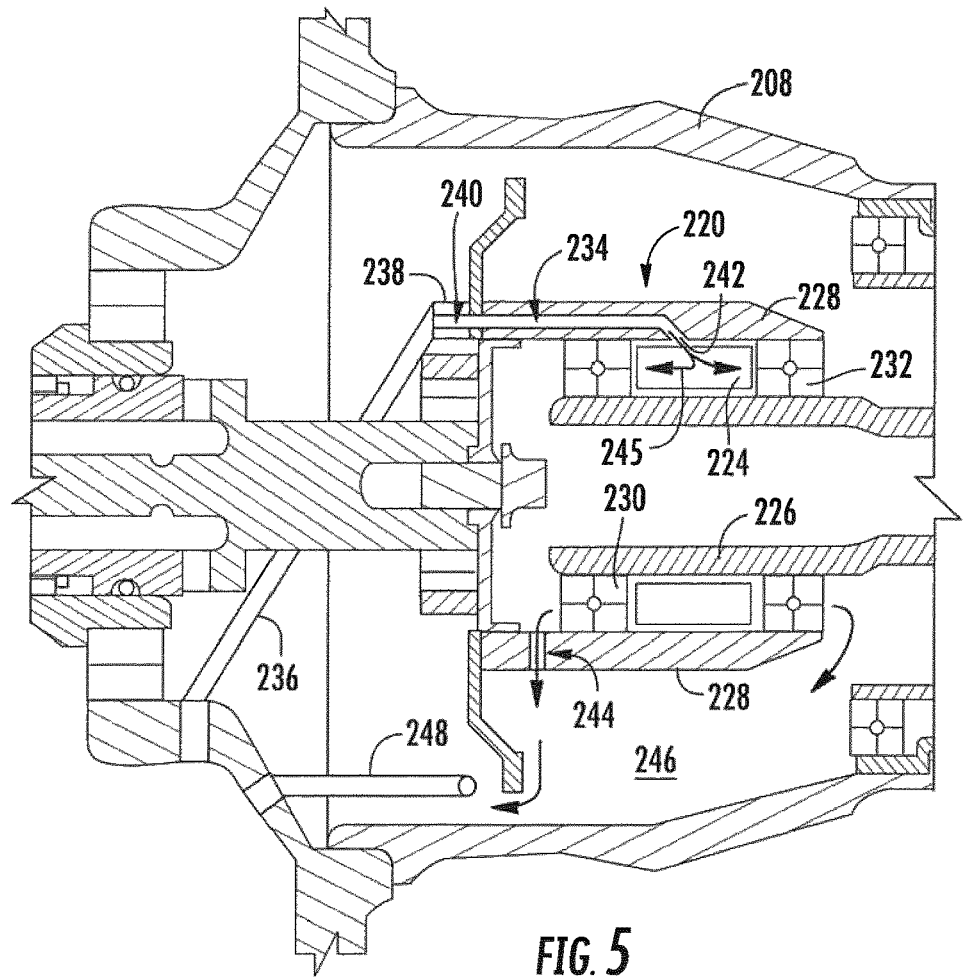
FIG. 5 is a close-up, cross-sectional view of a lubrication oil system of the exemplary turning unit of FIG. 2 in accordance with an exemplary embodiment of the present disclosure.

Referring still to FIG. 3, and now also briefly to FIG. 5, it will be appreciated that the turning unit 200 further includes a lubrication oil system for lubricating the primary one-way clutch 220. FIG. 5 provides a close-up, cross-sectional view of the primary one-way clutch 220 of the turning unit 200 of FIG. 3. As is depicted, the primary one-way clutch 220 generally includes a forward bearing 230 and an aft bearing 232 located forward and aft, respectively, of the plurality of sprags 224 of the primary one-way clutch 220. For the embodiment depicted, each of the forward and aft bearings 230, 232 are configured as ball bearings. However, in other embodiments, any other suitable bearing configuration may be provided.

Additionally, for the embodiment depicted, the lubrication oil system includes a lubrication oil delivery cavity 234 defined within the outer race 228 of the primary one-way clutch 220. A supply line 236 is also included providing lubrication oil to the lubrication oil delivery cavity 234 through a stationary to rotating connection member 238. The connection member 238 is a stationery member (i.e., stationary relative to the outer race 228) defining an opening 240 configured to align with the lubrication oil delivery cavity 234 defined within the outer race 228 and provide the lubrication oil thereto during operation. The supply line 236 may receive lubrication oil from a lubrication oil jet (not shown) within the accessory gearbox 100 of the gas turbine engine. Additionally, the lubrication oil delivery cavity 234 defines an outlet 242 immediately radially outward of the plurality of sprags 224, and between the forward and aft bearings 230, 232, such that the lubrication oil delivery cavity 234 may provide a flow 245 of lubrication oil to both the forward and aft bearings 230, 232 and sprags 224 during operation.

As is also depicted, the outer race 228 of the primary one-way clutch 220 further defines an outlet channel 244 configured to receive at least a portion of the flow 245 of lubrication oil and expel it to an outer cavity 246 within the turning assembly. The outer cavity 246 may in turn, provide such flow 245 of lubrication oil to an outlet line 248, which may return the lubrication oil to the accessory gearbox 100. Inclusion of a lubrication oil system in accordance with the present disclosure may ensure the plurality of bearings, including the forward and aft bearings 230, 232, of the primary one-way clutch 220 are provided with a desired amount of lubrication oil during operation. It should be appreciated, however, that in other exemplary embodiments, any other suitable lubrication oil system may be provided.

Figure 6:
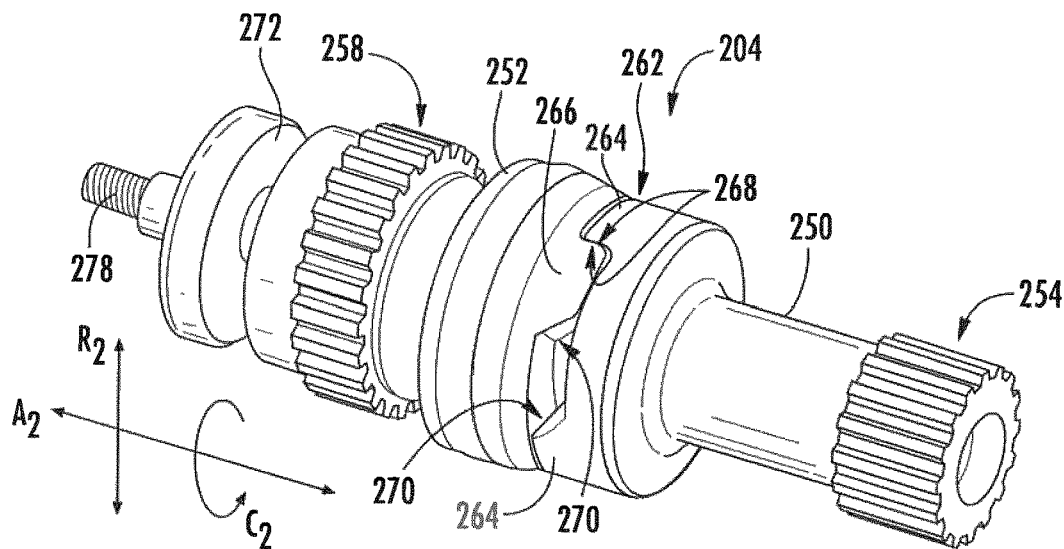
FIG. 6 is a perspective view of an output assembly of the exemplary turning unit of FIG. 2 in accordance with an exemplary embodiment of the present disclosure.
Figure 7:
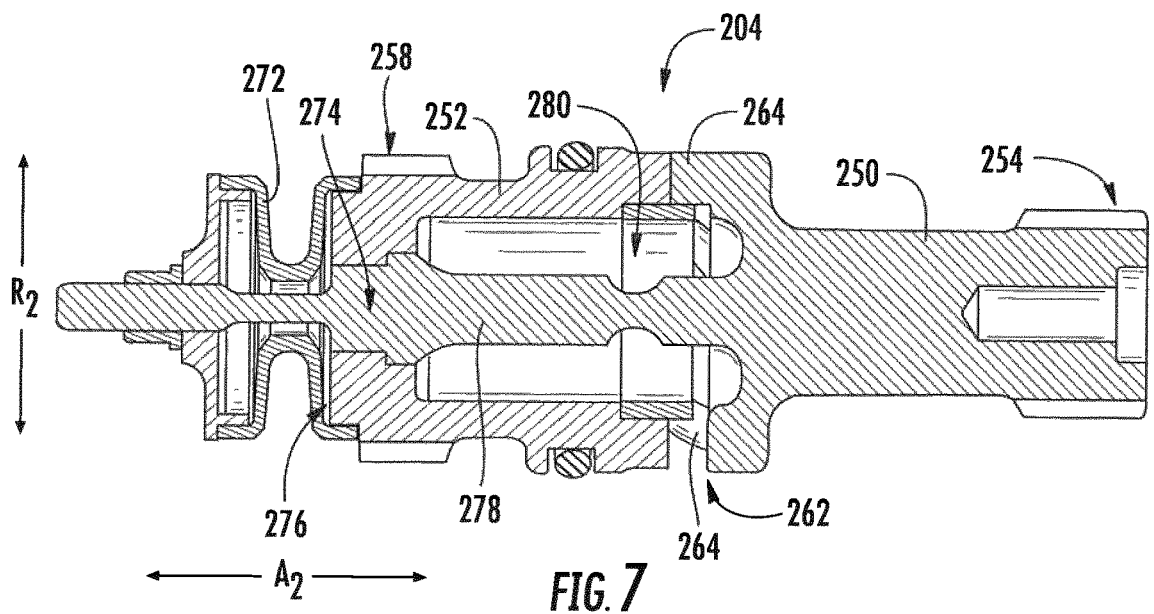
FIG. 7 is a side, cross-sectional view of the exemplary output assembly of FIG. 6.

Referring again back to FIG. 3, and now also to FIGS. 6 and 7, the output assembly 204 is configured to translate a rotational torque and power provided by the electric motor 202 (across the reduction gearbox 218 and the primary one-way clutch 220) to the gas turbine engine via the accessory gearbox 100. FIG. 6 provides a perspective view of the exemplary output assembly 204 of FIG. 3, and FIG. 7 provides a side, cross-sectional view of the output assembly 204 of FIG. 3. The exemplary output assembly 204 depicted generally defines an axial direction A2, a radial direction R2, and a circumferential direction C2. It should be appreciated, that the exemplary output assembly 204 depicted is provided by way of example only, and that in other exemplary embodiments, any other suitably output assembly or means for mechanically coupling the turning unit 200 to the accessory gearbox 100 may be provided.

As is depicted, the exemplary output assembly 204 generally includes a first rotating member 250 and a second rotating member 252. The first rotating member 250 includes a splined end 254 configured to mesh with a splined coupling 256 rigidly connected to the outer race 228 of the primary one-way clutch 220 (see FIG. 3). Accordingly, the first rotating member 250 is configured to mechanically couple the output assembly 204 to the primary one-way clutch 220. Similarly, the second rotating member 252 includes a splined section 258 configured to couple with a splined portion 260 of an accessory gear 106 of the accessory gearbox 100. Accordingly, the second rotating member 252 is configured for coupling to the accessory gearbox 100, and more specifically for coupling the turning unit 200 to the accessory gearbox 100.

As may be seen most clearly in FIG. 6, the first and second rotating members 250, 252 of the output assembly 204 are coupled through, and together form, an auxiliary one-way clutch 262. The auxiliary one-way clutch 262 may, in certain exemplary embodiments operate as a backup to the primary one-way clutch 220 within the turning unit 200. Moreover, for the embodiment depicted, the auxiliary one-way clutch 262 is configured as a one-way dog clutch. More specifically, for the embodiment depicted, the auxiliary one-way clutch 262 is formed of a plurality of teeth 264 of the first rotating member 250 and a plurality of teeth 266 of the second rotating member 252. Each of these plurality of teeth 264, 266 include a first, active engagement end 268 and a second, passive end 270. The first and second ends 268, 270 are positioned at opposite sides of the respective teeth 264, 266 along the circumferential direction C2 of the output assembly 204. The first, active engagement ends 268 are each substantially aligned with the axial direction A2 of the output assembly 204 (i.e., with a plane defined by the axial direction A2 and the radial direction R2), such that the first end 268 of a tooth 264 on the first rotating member 250 may transfer power and torque to the first end 268 of a tooth 266 on the second rotating member 252. By contrast, the second, passive ends 270 are slanted with respect to the axial direction A2 of the output assembly 204 (i.e., define an angle with a plane defined by the axial direction A2 and the radial direction R2, such as an angle greater than about twenty degrees), such that the second end 270 of a tooth 264 on the first rotating member 250 may not transfer any substantial amount of power or torque to the second end 270 of a tooth 266 of the second rotating member 252. Or, more notably, the second end 270 of a tooth 266 on the second rotating member 252 may not transfer any substantial amount of power or torque to the second end 270 of a tooth 264 on the first rotating member 250.

Accordingly, inclusion of an output assembly 204 in accordance with one or more embodiments of the present disclosure may allow for the output assembly 204 to act as a backup for the primary one-way clutch 220 within the turning unit 200.

Referring still to FIGS. 6 and 7, it will be appreciated that operation of the auxiliary one-way clutch 262 formed by the first and second rotating members 250, 252 is accommodated at least in part due to a spring member 272, which for the embodiment depicted, is coupled (or more specifically, is rigidly coupled) to the first rotating member 250. More specifically, for the embodiment depicted, the second rotating member 252 defines an opening 274 along the axial direction A2 at a distal end 276 opposite from the auxiliary one-way clutch 262. Additionally, the first rotating member 250 includes an extension 278 extending generally along the axial direction A2 and through the opening 274 defined by the second rotating member 252. The spring member 272 of the output assembly 204 is attached to the extension 278 at a location spaced from the distal end 276 of the second rotating member 252. The spring member 272 extends to the second rotating member 252, pressing the second rotating member 252 towards the teeth 264 of the auxiliary one-way clutch 262 of the first rotating member 250. More specifically, the spring member 272 presses together the auxiliary one-way clutch 262 formed by the first and second rotating members 250, 252.

Notably, the exemplary output assembly 204 depicted in FIGS. 3, 6, and 7 further includes a shear neck 280 providing for a shear point in the event of a failure. More specifically, for the embodiment depicted, the shear neck 280 is defined in the extension 278 of the first rotating member 250 of the output assembly 204, and more specifically still is configured as a circumferential groove in the extension 278 of the first rotating member 250. Accordingly, in the event of a failure of e.g., the primary one-way clutch 220 of the turning unit 200 and/or the auxiliary one-way clutch 262 of the output assembly 204, the output assembly 204 is configured to shear apart at the shear neck 280, decoupling the turning unit 200 from the accessory gearbox 100 and preventing or minimizing an amount of damage provided to the remaining components of the turning unit 200.

For the embodiment depicted, the turning unit 200 is configured to be oriented generally along a vertical direction, such that the axial direction A2 of the output assembly 204 is also oriented generally along the vertical direction (i.e., more vertical than horizontal). Accordingly, with such a configuration, in the event of a shear at the shear neck 280 of the output assembly 204, the second rotating member 252, and a portion of the extension 278 of the first rotating member 250, may recess into the accessory gearbox 100, allowing the accessory gearbox 100 and gas turbine engine to operate without engaging the turning unit 200, despite the failure within the turning unit 200.

Referring back generally to FIGS. 2 and 3, it will be appreciated that the exemplary turning unit 200 depicted further includes a controller 282. The controller 282 is operably connected to the motor 202 of the turning unit 200, and is further operably connected to the power source for the motor 202, such as the ground power source 206. For the embodiment depicted, the controller 282 is operably connected to the motor 202 via a wired connection 284, and similarly, the ground power source 206 is electrically connected to the motor 202 via a wired connection 286. Moreover, for the embodiment depicted, the turning unit 200 includes a temperature sensor 288 positioned in or around the electric motor 202 for determining a temperature in or around the electric motor 202 (FIG. 3). The temperature sensor 288 is similarly operably connected to the controller 282 via, for the embodiment depicted, a wired connection 290.

As stated, the electric motor 202 is operable to rotate, through the output assembly 204, one or more components of the compressor section or the turbine section of the gas turbine engine at a relatively low rotational speed during a shutdown condition of the gas turbine engine. More specifically, for the embodiment depicted, the controller 282 is configured to operate the electric motor 202, such that the electric motor 202 is operable in such a manner. In at least certain exemplary aspects, rotating the gas turbine engine at the relatively low rotational speed during the shutdown condition of the gas turbine engine may include rotating the gas turbine engine substantially continuously for at least a predetermined amount of time (e.g., at least about one hour, such as at least about two hours, such as at least about five hours). The predetermined amount of time correlates to an expected amount of time for certain components of the gas turbine engine to cool sufficiently to reduce the likelihood of deformation. Additionally, or alternatively, rotating the gas turbine engine at the relatively low rotational speed during the shutdown condition of the gas turbine engine may include rotating the gas turbine engine in a pulsed or patterned manner for least the predetermined amount of time. For example, the controller 282 may be configured to operate the turning unit 200 to rotate the gas turbine engine for certain time intervals or patterns, including, for example: (a) thirty seconds on, thirty seconds off; (b) two minutes on, two minutes off; (c) ten seconds on, fifty seconds off; etc.

Moreover, for the embodiment depicted, the controller 282 may determine the gas turbine engine is in a shutdown condition based on a torque applied by the electric motor 202 through the turning unit 200 to the accessory gearbox 100. For example, if an amount of torque applied by the electric motor 202 is below a predetermined minimum threshold, the controller 282 may also determine that either the gas turbine engine is operating and rotating more quickly than would otherwise be rotated by the electric motor 202, or alternatively that there has been a failure. Similarly, if an amount of torque applied by the electric motor 202 is above a predetermined maximum threshold, the controller 282 may also determine that there has been a failure. However, if the amount of torque applied by the electric motor 202 is above the predetermined minimum threshold and below the predetermined maximum threshold, the controller 282 may determine the turning unit 200 is operating as desired to rotate the gas turbine engine at a relatively low rotational speed during a shutdown condition of the gas turbine engine.

Figure 8:
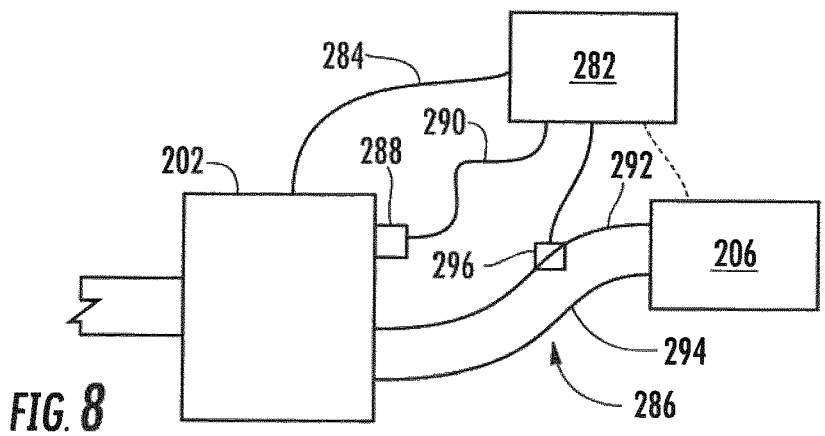
FIG. 8 is a schematic view of an electric motor and controller in accordance with an exemplary embodiment of the present disclosure.

Referring briefly to FIG. 8, providing a schematic view of the electric motor 202 and controller 282 of the exemplary turning unit 200 of FIGS. 2 and 3, it will be appreciated that for the embodiment depicted the controller 282 may determine a torque applied by the electric motor 202 through the turning unit 200 to the accessory gearbox 100 based on a feedback current. More particularly, for the exemplary embodiment depicted the power source 206 is connected to the electric motor 202 through a positive electric line 292 and a negative electric line 294. A current sensor 296 is provided operably connected to one of the positive or negative electric lines 292, 294 to determine a current feedback from the electric motor 202 during operation of the electric motor 202. The current sensor 296 is operably connected to the controller 282, such that the controller 282 may determine the current feedback. Further, as the current may vary based on a temperature in or around the electric motor 202, the temperature sensor 288 is provided to determine such temperature. The temperature sensor 288 is also operably connected to the controller 282, such that the controller 282 may determine a corrected current. The corrected current may then be used to determine a torque applied by the electric motor 202 through the turning unit 200 to the accessory gearbox 100.

In certain exemplary embodiments, the controller 282 may be configured to operate the electric motor 202 and determine a torque periodically at predetermined intervals to determine a shutdown condition of the gas turbine engine. However, in other exemplary embodiments, the controller 282 may be operably connected to, e.g., a controller of the gas turbine engine (such as a FADEC of the gas turbine engine), or a controller of an aircraft including the gas turbine engine, and may receive a command or signal from such controller to determine the gas turbine engine is operating in a shutdown condition.

Additionally, in certain exemplary aspects, the turning unit 200 may be configured to operate continuously or in a periodic manner for a sufficient amount of time for certain components of the engine to cool below a certain threshold temperature. For example, in certain exemplary embodiments, the turning unit 200 may be configured to operate for at least about one hour, such as at least about four hours. More specifically, in certain exemplary embodiments, the turning unit 200 may be configured to operate for between one hour and about ten hours, such as for between about three hours and about eight hours.

Inclusion of a turning unit in accordance with one or more exemplary embodiments of the present disclosure may therefore increase a useful life of a gas turbine engine with which it is installed, by reducing a likelihood of certain components deforming subsequent to flight operations due to the relatively high temperatures to which the components are exposed and the weight of the components being supported.

Notably, although the turning unit 200 is described herein as a device to prevent or minimize a likelihood of certain components deforming subsequent to flight operations, in certain exemplary embodiments, the turning unit may additionally, or alternatively, be used during inspection of the gas turbine engine through its borescope holes. With such a configuration, the turning unit may instead be permanently installed on the accessory gearbox at any suitably location on the accessory gearbox (such as a dedicated crank point).

Figure 9:
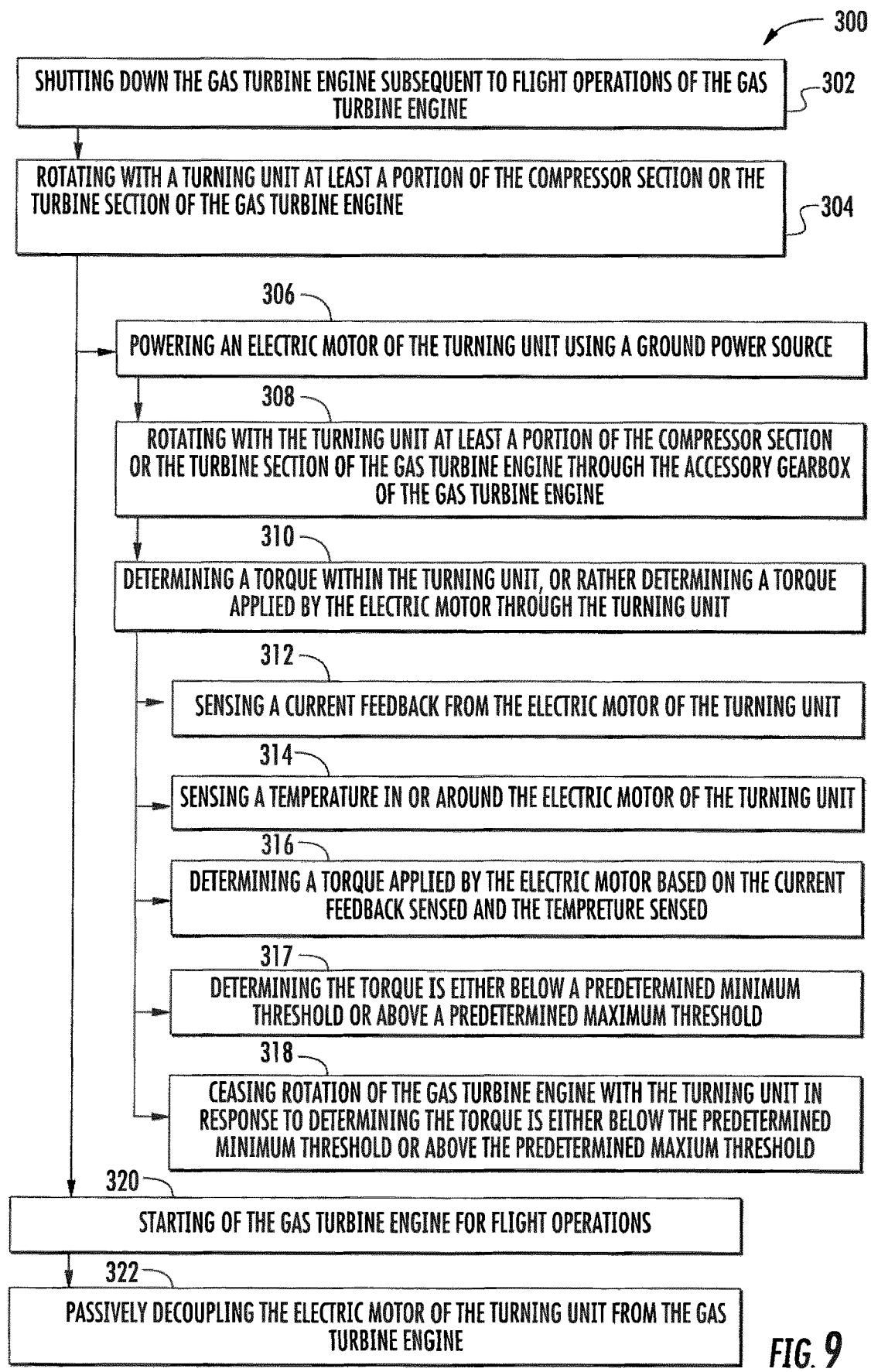
FIG. 9 is a flowchart of a method for operating a gas turbine engine in accordance with an exemplary aspect of the present disclosure.

Referring now to FIG. 9 a flow diagram is provided of a method 300 for operating a gas turbine engine. The method 300 may be utilized in certain exemplary aspects with one or more of the exemplary gas turbine engines and/or turning units described above with reference to FIGS. 1 through 8. Accordingly, the gas turbine engine may generally include a compressor section, a combustion section, a turbine section, an accessory gearbox, and a turning unit. The accessory gearbox may be attached to a core turbine engine of the gas turbine engine.

The exemplary method generally includes at (302) shutting down the gas turbine engine subsequent to flight operations of the gas turbine engine. Shutting down the gas turbine engine at (302) may generally include any operations to cease generation of combustion gasses within a combustion chamber of the combustion section of the gas turbine engine. Typically, shutting down the gas turbine engine at (302) occurs after completion of a flight of an aircraft including the gas turbine engine.

Additionally, the exemplary method 300 includes at (304) rotating with a turning unit at least a portion of the compressor section or the turbine section of the gas turbine engine, e.g., at a rotational speed of less than about fifty revolutions per minute. For example, in certain exemplary aspects, rotating with the turning unit at least a portion of the compressor section of the turbine section at (304) may include rotating at least a portion of the compressor section of the turbine section a rotational speed of less than about twenty-five revolutions per minute, such as less than about ten revolutions per minute, such as less than about three revolutions per minute, such as less than about one revolution per minute. Additionally, or alternatively, rotating with the turning unit at least a portion of the compressor section or the turbine section of the gas turbine engine at (304) may include rotating with the turning unit at least a portion of the compressor section or the turbine section in a pulsed or patterned manner. For example, rotating at (304) may include operating the turning unit to rotate at least a portion of the compressor section of the turbine section in one or more of the following patterns: (a) thirty seconds on, thirty seconds off; (b) two minutes on, two minutes off; (c) ten seconds on, fifty seconds off; etc. Accordingly, rotating the engine at (304) may not necessarily include rotating the engine continuously.

Moreover, as is also depicted, rotating with the engine turning unit at least a portion of the compressor section or the turbine section of the gas turbine engine at (304) includes, for the exemplary aspect depicted, at (306) powering an electric motor of the turning unit using a ground power source. For example, in certain exemplary aspects, powering the electric motor of the turning unit using the ground power source at (306) may include electrically connecting the electric motor of the turning unit to a power source remote to the gas turbine engine and an aircraft with which the gas turbine engine is installed, including, for example, an electrical power grid, an electric generator, a remote electrical power storage device, etc.

Further, for the exemplary aspect depicted, rotating with the engine turning unit at least a portion of the compressor section or the turbine section of the gas turbine engine at (304) includes at (308) rotating with the turning unit at least a portion of the compressor section or the turbine section of the gas turbine engine through the accessory gearbox of the gas turbine engine. For example, in certain exemplary embodiments, the turning unit may be coupled to an accessory gear of the gearbox via an output assembly, such that rotating at least a portion of the compressor section or the turbine section includes rotating an accessory gear of the accessory gearbox with an output assembly of the engine turning unit.

Further, still, for the embodiment depicted, the method 300 may also include monitoring one or more operating parameters of the turning unit to control operation of the turning unit. More specifically, for the exemplary aspect depicted, rotating with the turning unit at least a portion of the compressor section or the turbine section at (304) further includes at (310) determining a torque within the turning unit, or rather determining a torque applied by the electric motor through the turning unit. More specifically, determining the torque within the turning unit at (310) includes at (312) sensing a current feedback from the electric motor of the turning unit, at (314) sensing a temperature in or around the electric motor of the turning unit, and at (316) determining a torque applied by the electric motor based on the current feedback sensed at (312) and the temperature sensed at (314).

Referring again to the method 300 of FIG. 9, will be appreciated that operation of the turning unit may be controlled based at least in part on the torque determined at (310). For example, as is depicted, determining the torque at (310) further includes at (317) determining the torque is either below a predetermined minimum threshold or above a predetermined maximum threshold. When the torque is below the predetermined minimum threshold, it may be determined that either the gas turbine engine has begun operating (such that the accessory gear to which the turning unit is attached is rotating more quickly than nominal operation of the turning unit), or that a failure has occurred (e.g., the output assembly has shared off at a shear neck). Similarly, when the torque is above the predetermined maximum threshold, it may similarly be determined a failure has occurred.

Accordingly, for the exemplary method 300 depicted in FIG. 9, determining the torque at (310) further includes at (318) ceasing rotation of the gas turbine engine with the turning unit in response to determining at (317) the torque is either below the predetermined minimum threshold or above the predetermined maximum threshold. Such a step may increase a useful life of the turning unit.

Referring still to FIG. 9, the exemplary method 300 further includes at (320) starting of the gas turbine engine for flight operations, and at (322) passively decoupling the electric motor of the turning unit from the gas turbine engine. In at least certain exemplary aspects of the present disclosure, passively decoupling the electric motor of the turning unit from the gas turbine engine at (322) may be accomplished by inclusion of a one-way clutch within the turbine unit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A turning unit for a gas turbine engine comprising a compressor section, a turbine section, and an accessory gearbox, the turning unit comprising:
   an output assembly configured to be mechanically coupled to the gas turbine engine;
   an electric motor operable to rotate, through the output assembly, one or more components of the compressor section or the turbine section at a rotational speed less than fifty revolutions per minute during a shut-down condition of the gas turbine engine; and
   a one-way clutch;
   wherein the output assembly comprises a first rotating member, a second rotating member, and a shear neck, the first rotating member extends through the second rotating member, the shear neck is defined in the first rotating member, and the shear neck is arranged between the one-way clutch and the accessory gearbox.

2. The turning unit of claim 1, wherein the output assembly is configured to be connected to the accessory gearbox of the gas turbine engine.

3. The turning unit of claim 1, wherein the turning unit further comprises a reduction gearbox, wherein the output assembly is rotatable by the electric motor across the reduction gearbox.

4. The turning unit of claim 3, wherein the reduction gearbox has a gear ratio of at least 100:1.

5. The turning unit of claim 1, wherein the electric motor is mechanically connected to the output assembly through the one-way clutch.

6. The turning unit of claim 1, wherein the turning unit further comprises a lubrication oil system for lubricating the one-way clutch.

7. The turning unit of claim 1, wherein the shear neck of the output assembly is configured as a circumferential groove.

8. The turning unit of claim 1, wherein the first and second rotating members together form an auxiliary one-way clutch.

9. The turning unit of claim 8, wherein the second rotating member is configured for coupling the turning unit to the accessory gearbox of the gas turbine engine.

10. The turning unit of claim 8, wherein the second rotating member defines an opening, wherein the first rotating member includes an extension extending through the opening, and wherein the output assembly further comprises a spring member attached to the extension and pressing together the auxiliary one-way clutch formed by the first and second rotating members.

11. The turning unit of claim 1, wherein the electric motor is configured to be electrically connected to a ground power source.

12. The turning unit of claim 1, wherein the electric motor generates a maximum power of less than fifty watts.

13. A gas turbine engine comprising:
   a compressor section and a turbine section;
   an accessory gearbox mechanically coupled to one or more components of the compressor section or the turbine section; and
   a turning unit comprising an output assembly and an electric motor, the output assembly mechanically coupled to the accessory gearbox and the electric motor operable to rotate, through the output assembly, the one or more components of the compressor section or the turbine section at a rotational speed less than fifty revolutions per minute during a shut-down condition of the gas turbine engine;
   wherein the output assembly comprises a first rotating member, a second rotating member, and a shear neck, the first rotating member extends through the second rotating member, the shear neck is defined in the first rotating member, and the shear neck is arranged between a one-way clutch of the turning unit and the accessory gearbox of the gas turbine engine.

14. A method of operating a gas turbine engine comprising:
   shutting down the gas turbine engine subsequent to flight operations of the gas turbine engine;
   rotating with an electric motor of a turning unit at least a portion of a compressor section or a turbine section of the gas turbine engine at a rotational speed of less than fifty revolutions per minute; and
   in the event of a failure, shearing an output assembly of the turning unit apart at a shear neck to decouple the turning unit from an accessory gearbox of the gas turbine engine,
   wherein the output assembly comprises a first rotating member, a second rotating member, and a shear neck, the first rotating member extends through the second rotating member, the shear neck is defined in the first rotating member, and the shear neck is arranged between a one-way clutch of the turning unit and the accessory gearbox of the gas turbine engine.

15. The method of claim 14, wherein rotating with the turning unit at least a portion of the compressor section or the turbine section of the gas turbine engine comprises:
   determining a torque within the turning unit.

16. The method of claim 15, wherein determining the torque within the turning unit comprises:
   sensing a current feedback from the electric motor of the turning unit; and sensing a temperature in or around the electric motor of the turning unit.

17. The method of claim 15, wherein determining the torque within the turning unit comprises:
   determining the torque is either below a predetermined minimum threshold or above a predetermined maximum threshold; and
   ceasing rotation of the gas turbine engine with the turning unit in response to determining the torque is either below the predetermined minimum threshold or above the predetermined maximum threshold.

18. The method of claim 14, wherein rotating with the turning unit at least a portion of the compressor section or the turbine section of the gas turbine engine comprises powering an electric motor of the turning unit using a ground power source.

19. The method of claim 14, wherein rotating with the turning unit at least a portion of the compressor section or the turbine section of the gas turbine engine comprises rotating with the turning unit at least a portion of the compressor section or the turbine section of the gas turbine engine through the accessory gearbox of the gas turbine engine.

20. The method of claim 14, further comprising:
starting up the gas turbine engine for flight operations; and
passively decoupling an electric motor of the turning unit from an accessory gearbox of the gas turbine engine.

* * * * *